Nov. 26, 1968     L. F. LAHTINEN     3,412,500
FISH LURE
Filed June 10, 1966
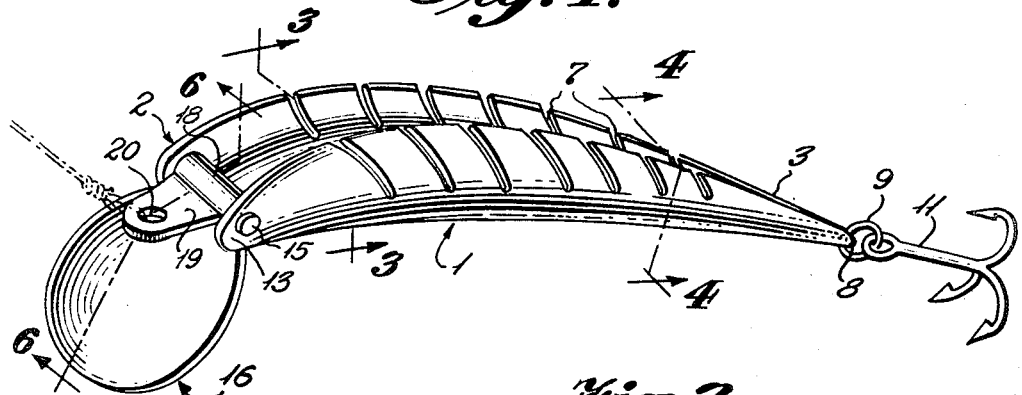
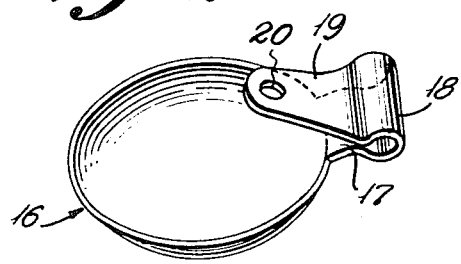
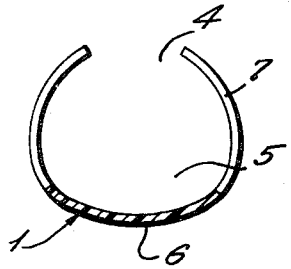
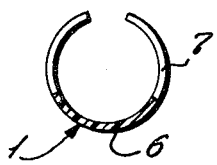
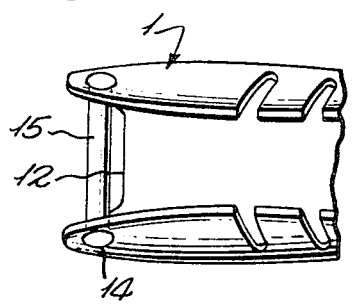
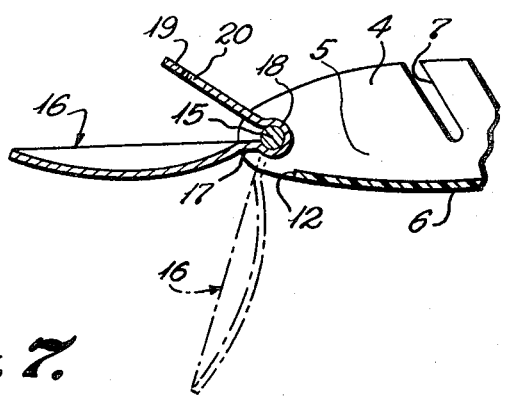
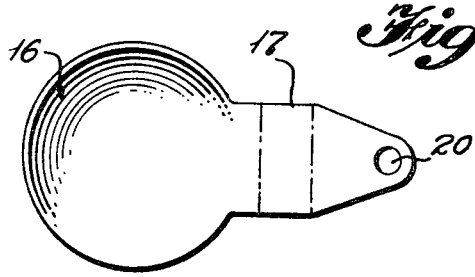
INVENTOR.
Lauri F. Lahtinen
BY
Shoemaker and Mattare
ATTORNEYS

United States Patent Office 3,412,500
Patented Nov. 26, 1968

3,412,500
FISH LURE
Lauri F. Lahtinen, Box 454, Hearst, Ontario, Canada
Filed June 10, 1966, Ser. No. 556,614
10 Claims. (Cl. 43—41)

ABSTRACT OF THE DISCLOSURE

The fish lure is formed in the shape of a small fish and comprises an elongated, longitudinally arcuate, hollow body having a head end, a tail end, bottom and opposed sides. The body is also approximately circular in cross section and tapers rearwardly from the head end to a pointed tail end. The convex side of the longitudinally arcuate body has a longitudinally extending tapering slot extending from the head end to the tail end. The head end carries a pivoted spoon-like lip.

This invention relates generally to the class of fishing and trapping and is directed particularly to improvements in fish lures.

The present invention has for a particular object to provide a new and novel fish lure which is not only attractive in appearance but which is so constructed as to have a "live" or life-like action as it is drawn through the water to thereby simulate a living animal such as a minnow or the like.

Another object of the invention is to provide a fish lure having the general form or outlines of a small fish and having a body formation such as to churn or stir the water through which it is drawn and create air bubbles and also produce sound by the water movements or vibrations.

It is another object of the invention to provide a fish lure which is designed or constructed in a novel manner to adapt it to receive and hold live bait, such as worms or grubs or other bait material, or a small fish or minnow and, when the bait is of a live nature such as a minnow or the like, to hold the bait without injuring it and in such a way that it cannot be injured when a fish attacks or grasps the lure.

A still further object of the invention is to provide a novel fish lure having a form in simulation of a minnow or other small fish and embodying a means which, as the lure is drawn through the water, will cause it to leap or dart with a life-like motion.

The invention will be best understood from a consideration of the following detailed description taken in connection with the accompanying drawings forming a part of the specification, wherein:

FIG. 1 is a view in perspective of a fish lure constructed in accordance with the present invention.

FIG. 2 is a view in perspective, on an enlarged scale, of the movable lip or spoon forming the head portion of the lure.

FIG. 3 is a transverse sectional view taken substantially on the line 3—3 of FIG. 1.

FIG. 4 is a transverse sectional view taken substantially on the line 4—4 of FIG. 1.

FIG. 5 is a top view of the head end of the lure with the lip or spoon removed.

FIG. 6 is a sectional view of an enlarged scale taken substantially on the line 6—6 of FIG. 1.

FIG. 7 is a plan view of the blank for the lip, sleeve and arm.

Referring now more particularly to the drawings, the numeral 1 generally designates the body of the lure.

The body of the lure is of elongate longitudinally arcuate form, the numeral 2 designating the head end and the numeral 3 designating the tail end thereof.

The body 1 is also in the form of a relatively thin walled shell which is generally of approximately circular cross sectional form as shown most clearly by FIGS. 3 and 4 and tapers from a maximum diameter at the head end 2 to a relatively small diameter at the tail end 3.

The shell-like body is also open throughout the length of the convex side thereof, the longitudinal opening being generally designated 4. Thus the body generally resembles a transversely rounded open trough 5, the bottom of which is solid or imperforate throughout substantially the entire length of the body, such bottom being designated 6.

As will be readily apparent from FIG. 1 and FIGS. 3 and 4, the width of the longitudinal opening in the top or convex side of the body decreases from front to rear, the opening 4 being very nearly or substantially closed at the rear end of the body. Thus any object in the nature of bait material placed within the hollow shell-like body cannot slide out of the body as the lure is drawn through the water head end first.

The opposite side walls of the body are provided with a plurality of relatively closely spaced slots 7 which open through the top edges of the walls and extend downwardly through approximately ¾ of the depth of the side walls. The slots are at an angle as shown, that is, they are inclined, or slope, from the top toward the rear of the body. These slots give to the body of the lure the appearance of fins and as the lure is drawn or moves through the water the slots will create a disturbance or agitation and thereby create air bubbles which will in turn produce sound.

As stated, the body of the lure tapers to the rear end terminating substantially in a point and at the latter end there is provided in the body, an opening 8 to receive a ring 9, by means of which hooks, such as a gang hook 11, may be attached.

The forward or head end of the lure body also tapers slightly and the bottom part of the body is cut away as indicated at 12 so that the front ends of the side walls project forwardly and are slightly reduced in height and rounded forming the spaced wings 13 and these wings have openings 14 therethrough which are aligned transversely of the body and in which are fixed the ends of a pivot pin 15 which extends across the width of the body at the head thereof as shown.

It will be seen from the foregoing that the maximum height and also the maximum width of the body is somewhat forwardly of the mid-portion of the length of the body, the body tapering from this mid-portion toward the front end or head end and also toward the tail end. The top edges of the side walls of the body curve forwardly and downwardly into the rounded wing ends.

Pivotally mounted or supported on the pin 15 is a circular lip which is generally designated 16. This lip is of large size in proportion to the width of the forward open end or mouth of the lure body.

The lip 16 is also slightly concaved or dished thus forming a "spoon," the hollow upper side or bowl being directed upwardly and forwardly in the operating position of the lure.

The lip or spoon has a rear side or edge and the material of the lip is extended to form the short arm 17 which is turned back or turned forwardly on itself to form the circular hinge sleeve 18 which encloses, or through which extends, the hinge pin 15 as shown.

The arm 17 is extended forwardly into the narrowing or tapered tongue 19, in the end of which is formed the aperture 20 for the attachment thereto of a fishing line.

The tongue extension 19 of the arm tapers somewhat in width as shown in FIG. 1. Also the tongue 19 extends forwardly and upwardly from the plane of the top or edge of the spoon. That is, as shown in FIG. 2, it diverges from the plane of the top edge or rim of the spoon. Thus when the lure is in operation or is being drawn through the water, the spoon will tend to swing downwardly on the pivot pin whereas the line attached to the tongue will tend to pull the tongue upwardly or raise the tongue. Thus it will be seen that as the lure is drawn along and the line is pulled with tugs or short light jerks, there will be an up and down movement imparted to the spoon, the tug on the line and on the tongue tending to swing the spoon upwardly and the pressure of the water against the concave side of the spoon tending to turn the spoon downwardly. Accordingly the body of the lure will be given an up and down movement in simulation of the movement of a live fish.

While the arm 19 has been referred to as extending upwardly and it is illustrated in this position in FIG. 2, it may be lowered with respect to the spoon to a position where it would substantially parallel the spoon or lip if this relationship between the arm and the lip is preferred or desired to change the action of the lure in the water. Accordingly it will be obvious that tugs of various force upon the line, attached to the tongue will cause the lip or spoon to rise or dip and, in turn, actuate the lure in the water in a manner to make it act realistically in imitation of a fish's movements.

The slots 7 cut slantingly, preferably, in the side walls of the lure body will create active water movement which will produce air bubbles and also create sounds which will attract fish and such sounds and active disturbance of the water creating air bubbles is also known to create anger in some fishes making them attack the object producing the disturbance.

The longitudinally extending slot or opening 4 allows the insertion of live minnows or other bait within the body of the lure where such bait will be safely retained, even when a fish makes a strike. Thus when the fish attacks the lure even if it hits the body of the lure instead of the hooks trailing therebehind, the bait will not be damaged and this, of course, will result in a saving in the use of live bait.

It will also be obvious that the lure may be used without organic bait as the action of the water rushing through the hollow body and past the vertical or transversely opening slots 7 will create a water disturbance and sounds to cause game fish to strike.

The body of the lure may be formed of a suitable light metal such as sheet aluminum and it may also be formed or molded of a plastic material, which may be colored or clear as desired. If made of a clear plastic the bait positioned within the body will be clearly visible and thus, if minnows are used as bait, the movement of the live bait in the body of the lure can be clearly seen by the fish. This would result in a greater number of strikes by game fish.

From the foregoing it will be apparent that there is provided by the present invention a new and very different type of fish lure which is not only attractive in appearance and may be easily or inexpensively fabricated and marketed, but a lure which, because of its construction, will be very effective in use to catch all types of fish, particularly the fighting type of game fish.

I claim:

1. A fish lure, comprising an elongate, longitudinally arcuate, hollow body, open along the convex side thereof and having a head end with forwardly extending wings and a tail end, a lip body, means pivotally attaching said lip body to said head end, means for attaching a line to said lip body, means along opposite sides of the hollow body for creating turbulence and air bubbles in the water through which the lure body may be drawn, means for attaching a hook to said tail end of the lure body, said lip body being mounted on a pin extending between said wings and comprising a spoon having a concave side directed upwardly, the said means for attaching a line to the lip body comprising an arm or tongue integral with the lip body at the pivot means for the latter which extends forwardly from the said head end of the hollow lure body above the concave side of said lip body.

2. A fish lure, comprising an elongate, longitudinally arcuate, hollow body, open along the convex side thereof and having a head end and a tail end, a lip body, means pivotally attaching said lip body to said head end, means for attaching a line to said lip body, means along opposite sides of the hollow body for creating turbulence and air bubbles in the water through which the lure body may be drawn, means for attaching a hook to said tail end of the lure body, said hollow lure body being open at said head end and having forwardly extending side wing portions spaced apart transversely of the lure body, the said means pivotally attaching said lip body to the lure body comprising a pivot pin connected between said wing portions and means extending from the lip body around said pin in the nature of a hinge sleeve for facilitating vertical swinging of the lip body.

3. A fish lure, comprising an elongate, longitudinally arcuate, hollow body, open along the convex side thereof and having a head end and a tail end, a lip body, means pivotally attaching said lip body to said head end, means for attaching a line to said lip body, means along opposite sides of the hollow body for creating turbulence and air bubbles in the water through which the lure body may be drawn, and means for attaching a hook to said tail end of the lure body, the opening of the hollow lure body along the convex side thereof decreasing in width to a substantially closed condition to retain within the hollow lure body bait material introduced thereinto through the wider forward end portion of the opening.

4. A fish lure, comprising an elongate, longitudinally arcuate, hollow body, open along the convex side thereof and having a head end and a tail end, a lip body, means pivotally attaching said lip body to said head end, means for attaching a line to said lip body, means along opposite sides of the hollow body for creating turbulence and air bubbles in the water through which the lure body may be drawn, means for attaching a hook to said tail end of the lure body, said hollow body being of substantially circular cross sectional form, the opening in the convex side thereof being of maximum width at the said head end and decreasing in width to closely approaching a closed condition at said tail end, said hollow body tapering from a maximum cross sectional dimension to a substantially pointed rear end, the hollow body further being open at said head end and having side wall forwardly extending wing portions, the said means along opposite sides of the hollow body for creating turbulence consisting of slots in the side walls having top ends opening into the first opening, a pivot pin extending across said open head end of said hollow body and secured to and between said wing portions, means for attaching a hook to said tail end, said lip body being in the form of a substantially circular spoon having a convex side and a concave side, said spoon having a width greater than the width of the hollow body at said head end, the said spoon having an edge portion extended radially outward and turned back to form a hinge sleeve, said sleeve encircling said pivot pin and forming therewith the said means pivotally attaching the lip body to said head end of the hollow body, said hinge sleeve forming extension of the spoon being continued into a tongue which forms the said means for attaching a line to the lip body, and said tongue extending forwardly from the pivot pin and head end of the hollow body over the upwardly directed concave side of said spoon.

5. A fish lure, comprising an elongate, longitudinally arcuate, hollow body having a head end and a tail end, said body having a bottom and opposite sides, and being approximately circular in cross section and tapering rearwardly from the head end to a pointed tail end, the convex side of said longitudinally arcuate body having a longitudinally extending slot extending from the head end to the tail end and increasing in width from a point adjacent the tail end to the head end, said slot defining the upper edge of said opposite sides, the front end of said bottom being cut away with the head ends of said opposite sides on each side of the cut-away portion forming spaced wings, a lip body, means pivotally attaching said lip body to said spaced wings, means for attaching a line to said lip body, means extending inwardly and rearwardly from the upper edges of the opposite sides of the hollow body for creating turbulence and air bubbles in the water through which the lure body may be drawn, and means for attaching a hook to said tail end of the lure body.

6. The invention according to claim 5, wherein said hollow lure body is formed in one piece, and the wings are connected by a pin which projects through said wings.

7. The invention according to claim 5, wherein the said means along opposite sides of the lure body consists of slots spaced apart in the longitudinal direction of the lure body.

8. The invention according to claim 5, wherein said lip body is mounted on a pin extending between said wings and comprises a spoon having a concave side directed upwardly.

9. The invention according to claim 5, wherein said hollow lure body is thin walled and the said means along opposite sides thereof consists of slots spaced apart in the longitudinal direction of the lure body and opening at the top ends intot the said opening along the said convex side of the hollow lure body.

10. The invention according to claim 2, wherein the said means extending from the lip body around said pin continues forwardly as a tongue and has a free end formed to facilitate attaching said line thereto.

References Cited

UNITED STATES PATENTS

| | | | |
|---|---|---|---|
| D. 1,773,534 | 4/1956 | Szczesniak | 43—42.51 X |
| 2,507,908 | 5/1950 | Kaste | 43—42.03 |
| 2,663,963 | 12/1953 | Russell | 43—42.02 |

SAMUEL KOREN, *Primary Examiner.*

D. J. LEACH, *Assistant Examiner.*